Feb. 28, 1956 T. LOEW 2,736,150
PACKAGING APPARATUS
Filed Feb. 28, 1952 6 Sheets-Sheet 1
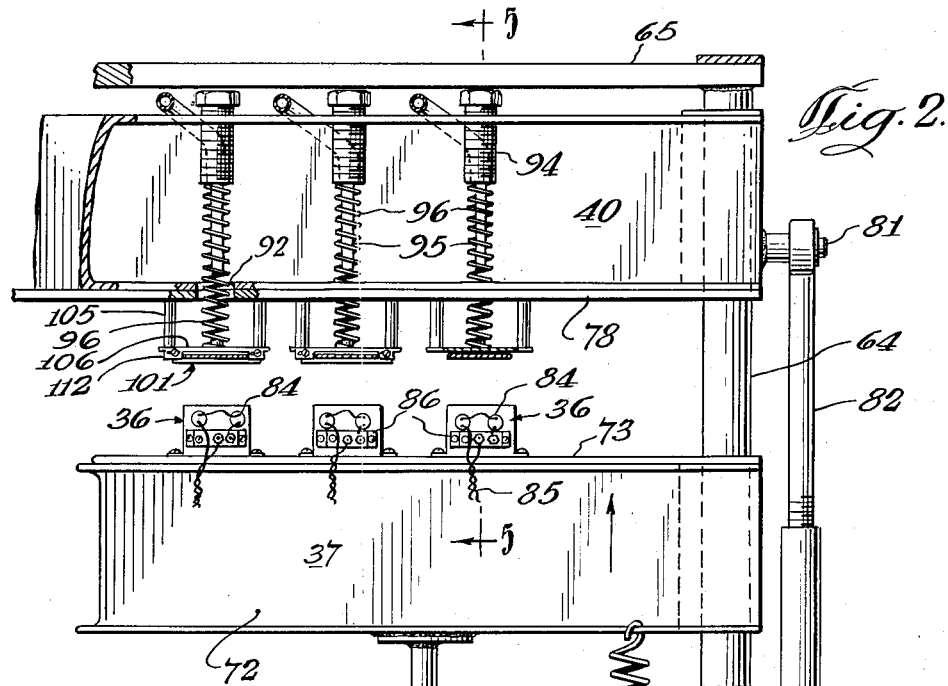
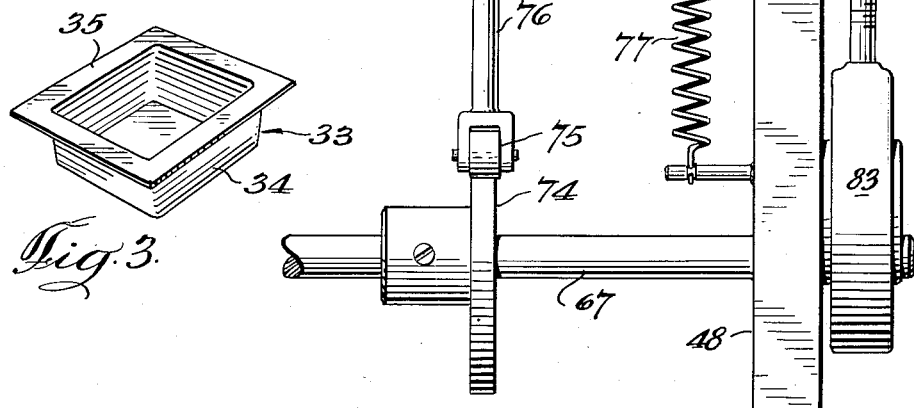
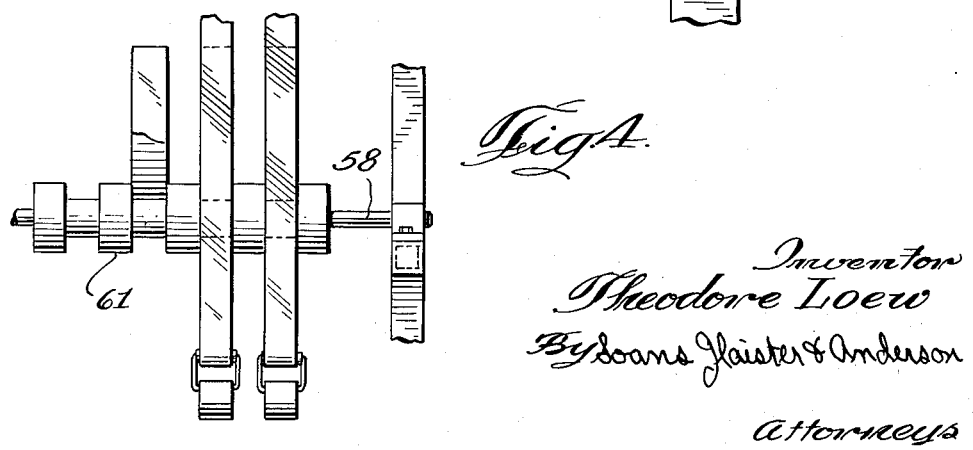
Inventor
Theodore Loew
By Soans Glaister & Anderson
Attorneys Feb. 28, 1956 — T. LOEW — 2,736,150
PACKAGING APPARATUS
Filed Feb. 28, 1952 — 6 Sheets-Sheet 2

Inventor
Theodore Loew
By Soans Glaister & Anderson
Attorneys

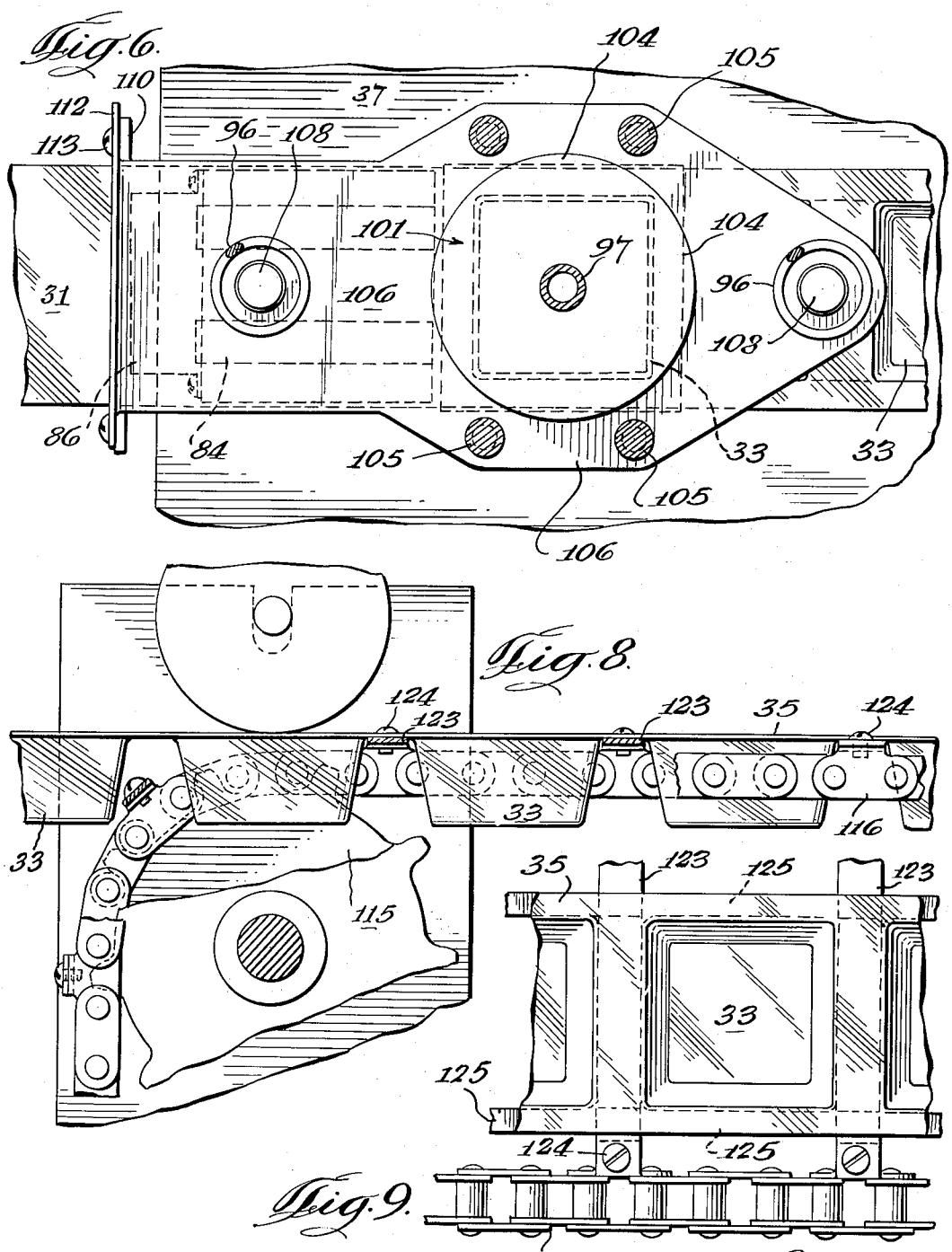

Feb. 28, 1956 T. LOEW 2,736,150
PACKAGING APPARATUS
Filed Feb. 28, 1952 6 Sheets-Sheet 4
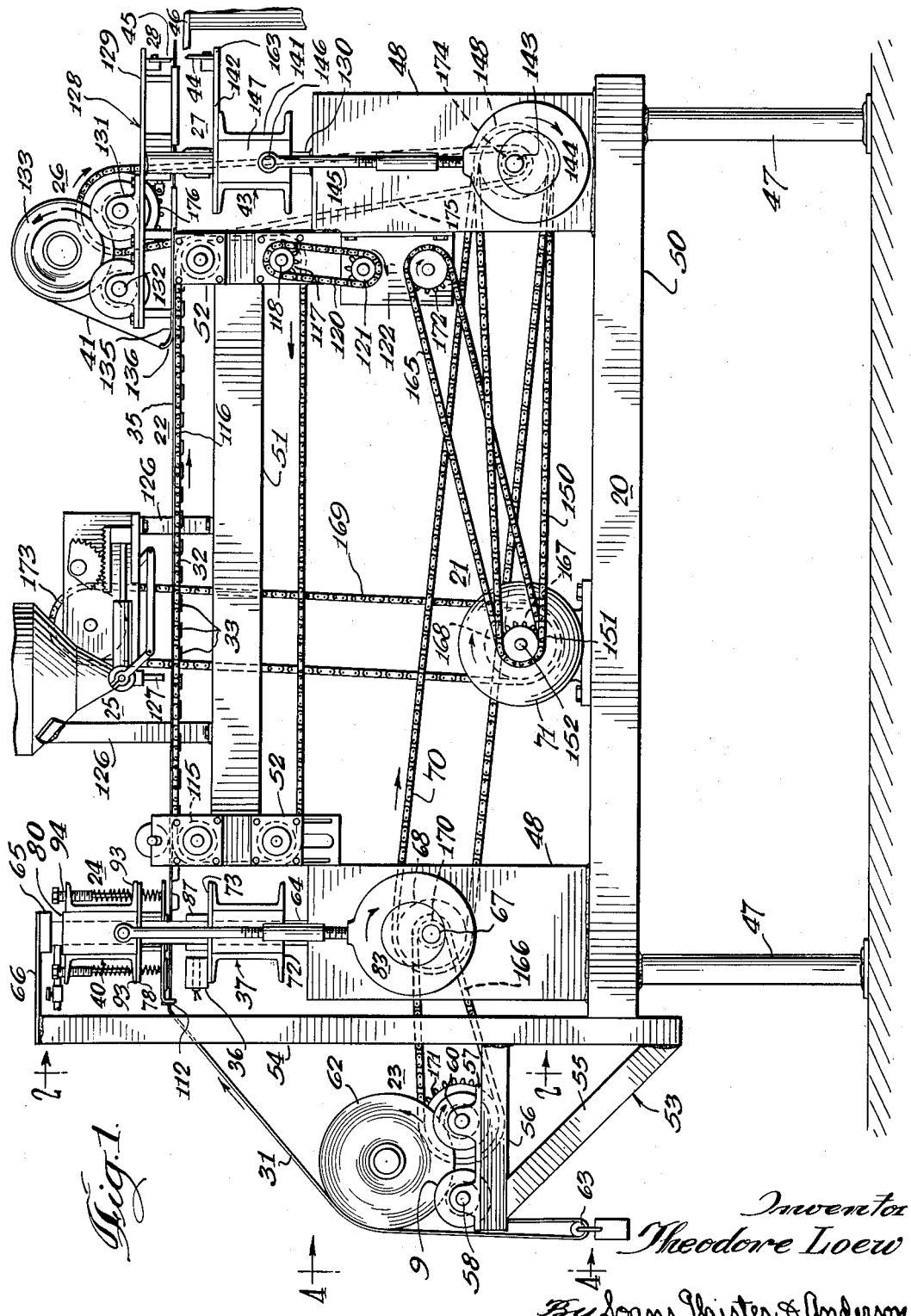
Inventor
Theodore Loew
By Soans Pfister & Anderson
Attorneys

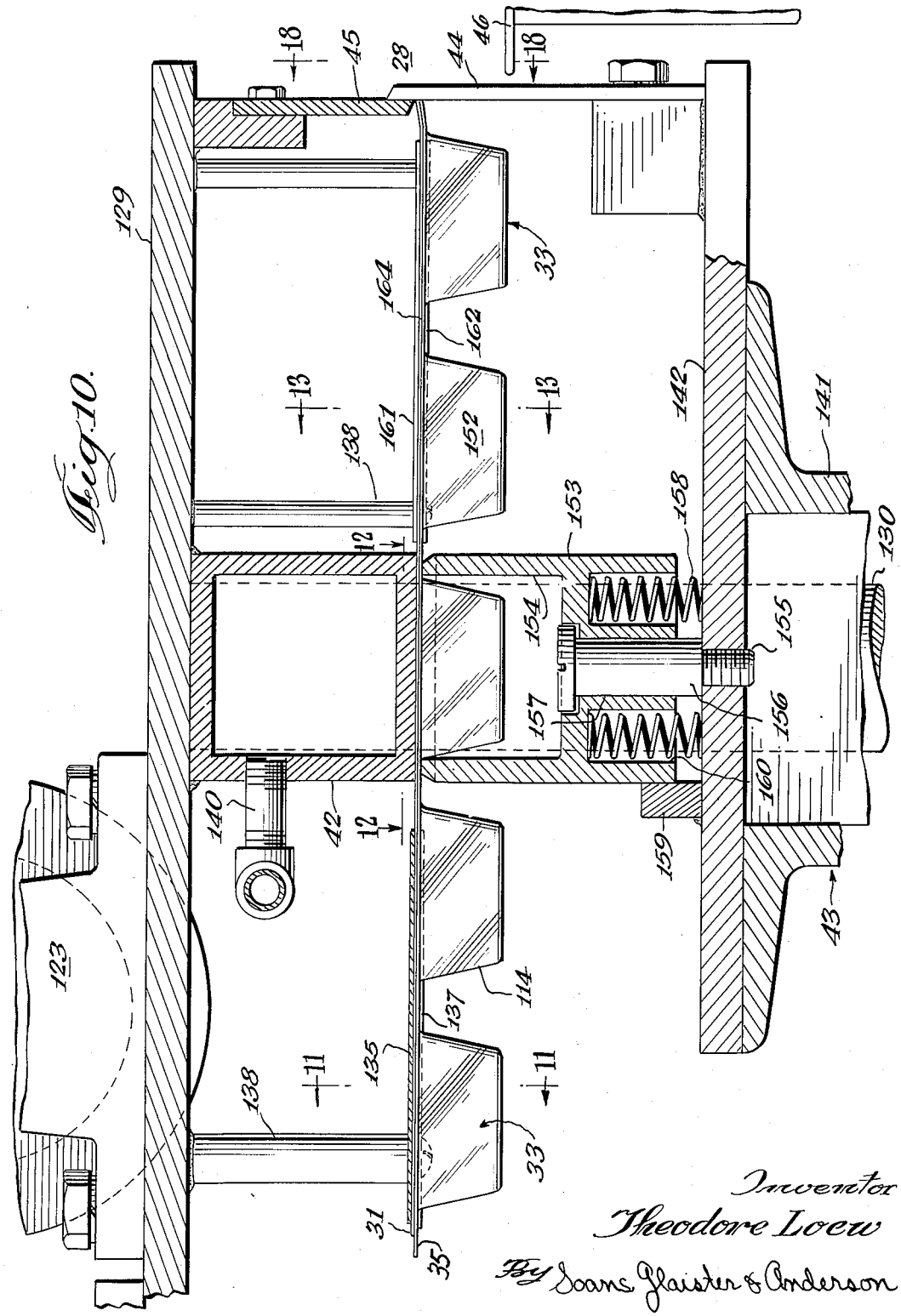

Feb. 28, 1956 T. LOEW 2,736,150
PACKAGING APPARATUS
Filed Feb. 28, 1952 6 Sheets—Sheet 6
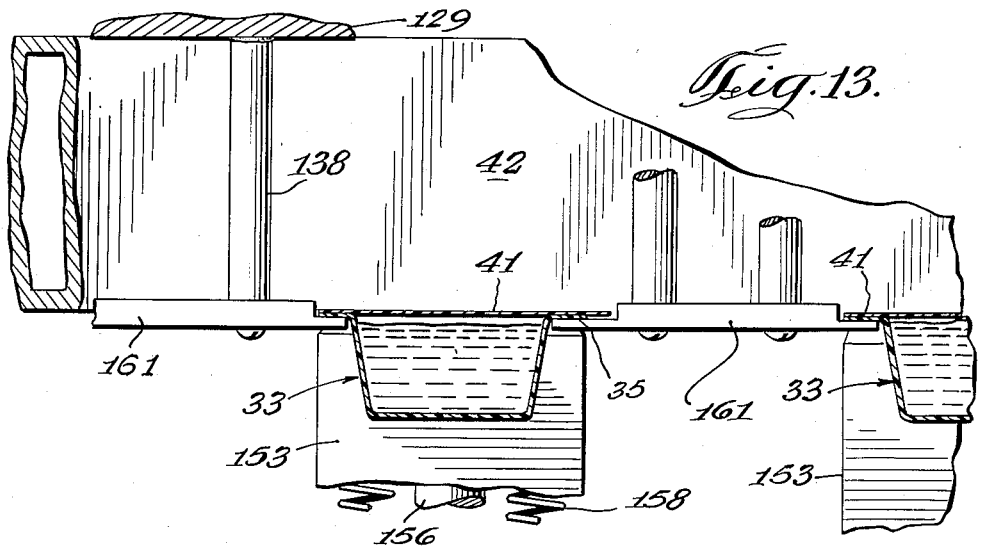
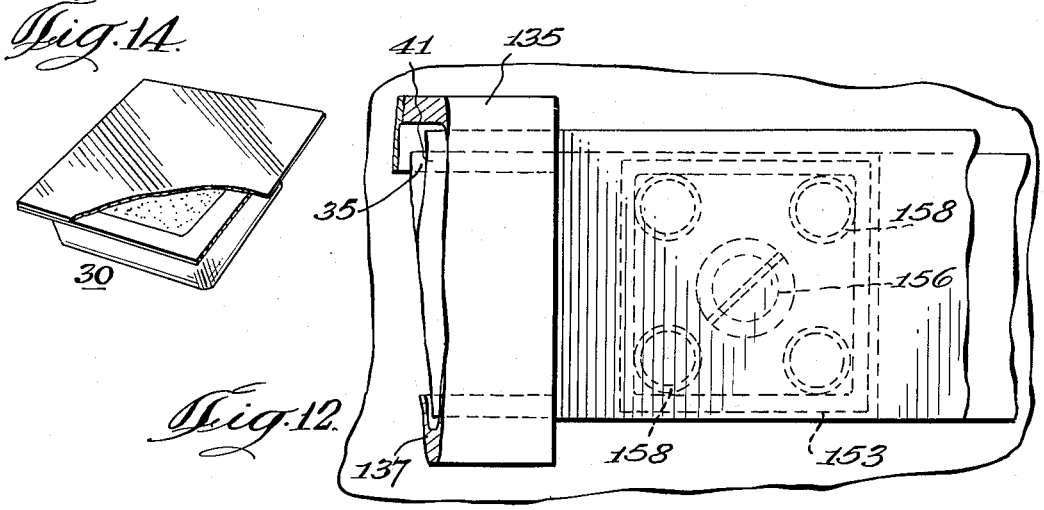
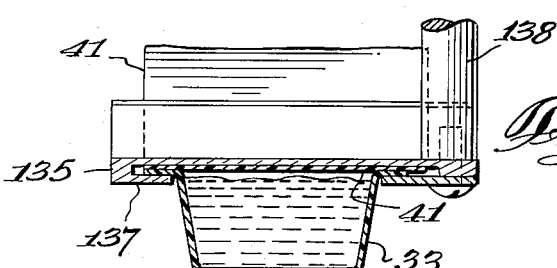
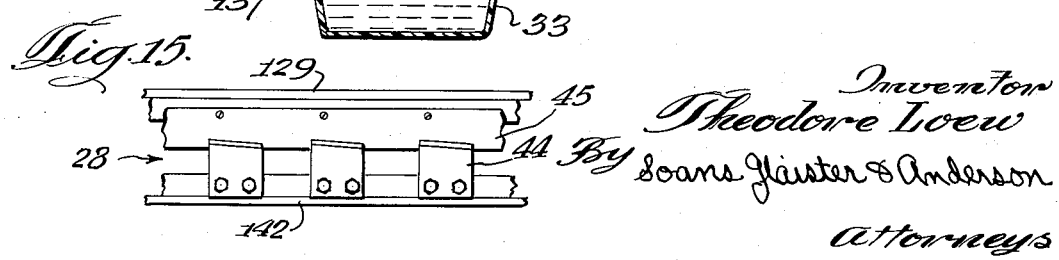
Inventor
Theodore Loew
By Soans Haister & Anderson
Attorneys

United States Patent Office 2,736,150
Patented Feb. 28, 1956

2,736,150

PACKAGING APPARATUS

Theodore Loew, Stamford, Conn., assignor to Kraft Foods Company, Chicago, Ill., a corporation of Delaware Application February 28, 1952, Serial No. 273,878

14 Claims. (Cl. 53—90)

The present invention relates generally to apparatus for packaging materials and, more particularly, to apparatus capable of forming packages from continuous strips of thermoplastic material.

The use of thermoplastic material as a packaging means has been favorably received, particularly in the packaging of food products, largely because of the adaptability of the thermoplastics to the forming of an inexpensive, substantially air-tight package which will maintain perishable items in a state of freshness for a relatively long period of time. Then too, by using a transparent thermoplastic, the packaged item is viewable in its preserved state for purposes of identification and sales appeal.

In any efficient packaging method or apparatus for use with thermoplastics which can be molded and hermetically sealed under heat and pressure, it is necessarily desirable to utilize the pliable and adhesive characteristics of the plastic material in the best and most economical manner and it is to this end that the present invention is directed.

The principal object of the present invention is the provision of an apparatus for fabricating a package from thermoplastic material in an efficient and economical manner.

A more specific object of the present invention is to provide an improved structure which includes means for forming a thermoplastic material into a longitudinal series of connected hollow containers, means for filling the containers, means for sealing the filled containers with a plastic material, and means for separating the individual packages.

Other object and advantages of the invention will be appreciated and the invention will be better understood from the following specification wherein the invention is described by reference to the particular embodiment illustrated in the accompanying drawings.

In the drawings:

Fig. 1 is a side elevational view of a packaging machine embodying various features of the present invention;

Fig. 2 is an enlarged sectional view of the container forming mechanism of the machine taken along line 2—2 of Fig. 1;

Fig. 3 is a perspective view of a container formed by the machine shown in Fig. 1, prior to filling and sealing;

Fig. 4 is a fragmentary sectional view of the container material feed mechanism of the machine taken along line 4—4 of Fig. 1;

Fig. 6 is a sectional view taken along line 6—6 of Fig. 5;

Fig. 8 is an enlarged side elevational view, partly cut away, of the conveyor mechanism of the packaging machine;

Fig. 9 is a plan view of a portion of the structure shown in Fig. 8;

Fig. 10 is an enlarged elevational view of the container sealing and cutting mechanisms of the machine with parts omitted and/or in section to more clearly show the structure involved;

Fig. 11 is a sectional view taken along line 11—11 of Fig. 10;

Fig. 12 is a fragmentary sectional view taken along line 12—12 of Fig. 10;

Fig. 13 is a sectional view taken along line 13—13 of Fig. 10;

Fig. 14 is a perspective view of a completed package with a portion of the cover broken away to more clearly illustrate the structure of the package.

Fig. 15 is a partial end view of the packaging machine with the package separating knives shown in closed position.

Figure 5:
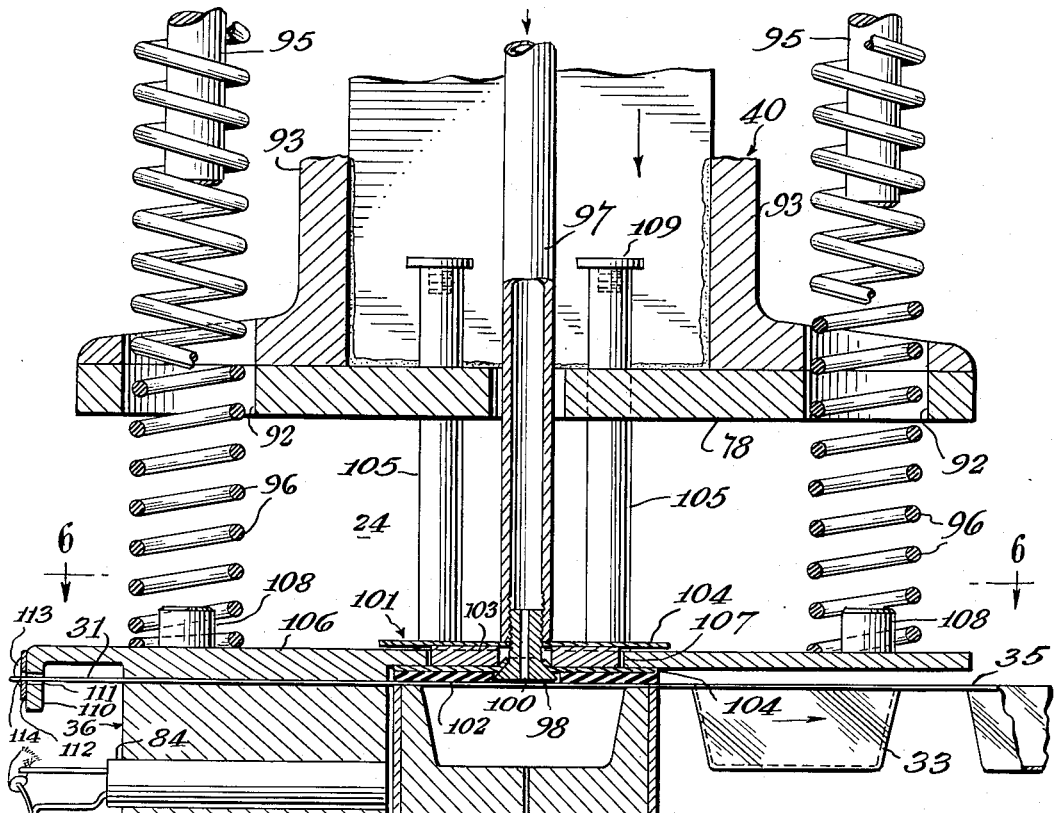
Fig. 5 is an enlarged sectional view of the container forming mechanism of the packaging machine, taken along line 5—5 of Fig. 2.
Figure 7:
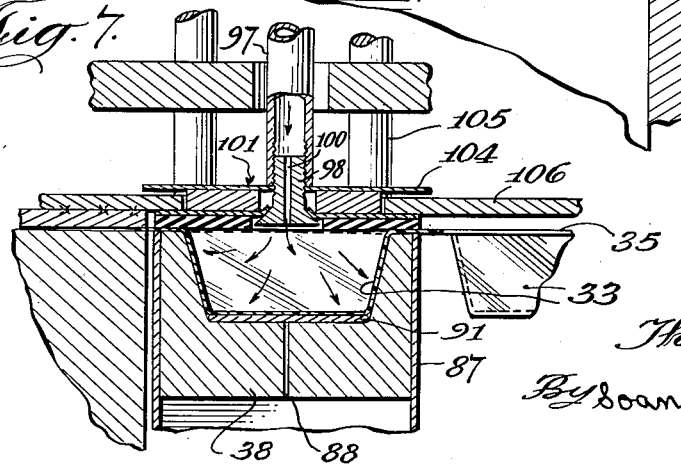
Fig. 7 is a sectional view of a part of the container forming mechanism of the machine taken along line 5—5 of Fig. 2, and illustrating a step in the packaging process.

The illustrated packaging machine is intended for use in the packaging of individual servings or relatively small portions of food particles, such as jams, jellies, condiments, margarine, relishes, process cheese, cream, etc.

As shown in Fig. 1 the packaging machine includes a frame structure 20 which supports a power drive mechanism 21, a conveyor mechanism 22, a container material feeding mechanism 23, a container forming mechanism 24, a filler mechanism 25, a cover strip feeding mechanism 26, a sealing mechanism 27, and a cutting mechanism 28. A brief description of the operation of the machine will be given in order that the structural aspects of the machine, to be described in detail thereafter, will be more readily understood. The various operating mechanisms are arranged on the packaging machine so that the steps involved in the packaging process are carried out in successive positions from the left or rearward end of the machine to the right or forward end of the machine.

Although it will be noted from the drawings and the subsequent description of the apparatus that the illustrated packaging machine is designed to simultaneously produce a plurality of packages 30, the operation will be described with respect to but one of the package assembly lines in the interest of simplifying the explanation and understanding thereof.

In the operation of the packaging machine, the endless conveyor mechanism 22 draws a strip of thermoplastic material 31, e. g. vinyl chloride, vinyl acetate, or a copolymer thereof, from the material feeding mechanisms 23 through the various operating mechanisms of the machine where the packaging processes are carried through. The conveyor mechanism 22 is intermittently driven by a Geneva drive (not shown) so that there is no movement of the conveyor 32 when the operating mechanisms of the machine act on the packaging material.

The conveyor 32 draws the strip of thermoplastic material from the feeding mechanism 23 to the forming mechanism 24 where the strip of material 31 is formed into a longitudinal series of connected, spaced-apart open topped containers 33 having generally upwardly extending side walls 34 and horizontal, outwardly extending marginal flanges 35 which are integral with the upper edges of the side walls 34. The forming mechanism 24 includes a heating unit 36 on a vertically movable lower platform 37 which moves into engagement with a section of the strip material 31 when the conveyor is stationary to heat the heated section to a moldable state. The platform 37 then lowers and the conveyor mechanism 22 draws the heated section of thermoplastic material forward until it overlies a hollow forming die 38 on the platform 37. The platform 37 then moves upward placing the heating unit 36 and die 38 in surface engaging relation with the strip of thermoplastic material 31, and an upper platform 40 moves downwardly to press the strip material 31 against the heating unit 36 and die 38. Fluid pressure is then introduced to the upper face of the previously heated section of the strip material 31 which is above the hollow die 38 so as to cause the strip 31 to move downwardly into the die and assume the shape thereof thereby forming an open topped container 33.

After the open topped container 33 is formed, the platforms 37 and 40 separate and the container 33 is drawn toward the filling mechanism 25. When the containers 33 arrive at the filling mechanism 25, they are filled with a predetermined amount of the food material to be packaged.

The filled containers 33 are then drawn to the sealing mechanism 27. As the containers move towards the sealing mechanism 27 a flat strip of thermoplastic material 41, which may or may not be of the same material as the thermoplastic strip 31 and having approximately the same width as the strip 31 is drawn at the same rate of speed as the moving containers 33 in a path which converges with the path of the horizontal flanges 35 of the moving containers 33 so as to form a cover for the filled containers 33.

At the sealing mechanism 27, the strip of thermoplastic material 41 is bonded to the marginal flanges 35 of the containers 33 by the application of heat and pressure. The covered containers 33 are positioned between a steam pipe 42 and an underlying platform 43 which moves upwardly to press the horizontal flanges 35 of the covered container 33 and cover strip 41 against the pipe 42 to thereby hermetically seal the container 33. The platform 43 then moves downwardly to permit further forward movement of the sealed container 33 as it is propelled along its path of movement by action of the conveyor mechanism 22.

Next, the sealed containers 33 are moved to the cutting mechanism 28 where the individual packages 30 are separated. This is done by the action of a pair of knives 44 and 45, the lower knife 44 moving upwards with the platform to cut through the transverse flange portions 35 and the strips 41 intermediate adjoining containers 33.

The completed package 30 which has thus been severed from the uncompleted packages is run off the packaging machine onto a chute or conveyor 46.

Now referring more specifically to the elements of the packaging machine, the frame structure 20 of the machine, shown in Fig. 1, is substantially a box type frame with a leg member 47 supportedly disposed at each of the four corners. A pair of inwardly facing vertical plate members 48 are fixedly positioned at opposite ends of a platform 50 and provide a support for a pair of laterally spaced longitudinal members 51 which are joined at their end portions to the adjacent plate members 48 by vertically disposed angle members 52 or the like which are secured to the vertical plate members 48 as by welding. It is to be understood, in this respect, that the far side of the frame structure 20 (not shown in the drawings) comprises structure similar to that shown for the near side.

The strip feeding mechanism 23 is shown in Figs. 1 and 4. The feeding mechanism is supported on a bracket 53 which is connected as by welding to the rear of the machine frame structure 20. The bracket 53 includes a pair of vertically disposed members 54 having suitable lateral brace means (not shown), a pair of laterally spaced, rearwardly extending, angle forming members 55 which are connected to the vertical members 54 and a pair of horizontal members 56. The bracket 53 supports a bearing means 57 which rotatably receives a pair of transverse shafts 58 and 60 spaced longitudinally of the machine. Each of the shafts 58 and 60 has a series of rollers 61 non-rotatably mounted in spaced relation along the shafts 58 and 60, with the rollers on the forward shaft 60 being longitudinally aligned with a similar number of rollers on the rear shaft 58. As best seen in Fig. 1, the spaced shafts 58 and 60 and rollers 61 provide a cradle support for the roll 62 of strip material 31 used in forming the container portion 33 of the package, and accordingly, the number of rollers 61 and the spacing thereof is dependent upon the width of the strip material 31 used and the number of package assembly lines to be operated.

The strip material 31 which is drawn from the roll 62 travels around a freely hanging weighted pulley 63 as shown in Fig. 1. The weighted pulley 63 tensions the strip 31 as it feeds into the forming mechanism 24.

The forming mechanism 24 is illustrated in Figs. 1, 2, 5, 6, and 7. The supporting structure for the forming mechanism 24 includes the pair of similarly facing plate members 48 each of which mounts a vertical tubular member 64 (Fig. 2) at the upper end of the plate. The upper ends of the tubular members are securely joined by a transverse brace member 65 and additional bracing is afforded by a pair of strap members 66 which join opposite end portions of transverse member 65 to the vertical members 54. The rear pair of plate members 48 have axially aligned openings therethrough providing a bearing support for opposite end portions of a transverse shaft 67 (Fig. 2) rotatably mounted therein. A sprocket wheel 68 is fixed to this shaft for rotation therewith and is connected to a motor 71 in a manner to be described later.

Overlying shaft 67 in vertically spaced relation thereto is an elongated transverse platform structure 37 comprising a pair of oppositely facing channel members 72 joined at their upper flanges by a horizontal plate member 73 having vertical openings (not shown) through the opposite end portions thereof for slidably engaging tubular members 64 at either side of the machine.

For controllably moving the transverse structure just described in a vertical direction, there is provided a cam 74 fixed to shaft 67 for rotation therewith which peripherally engages a cam follower element 75 held by an overlying vertical leg portion 76 fixed to the transverse platform structure 37. Thus, it is seen that rotation of the shaft will effect, through action of cam means 74 and 75, a vertical movement of the platformlike structure with the direction of the vertical movement being dependent upon the position of cam 74 in its cycle of rotation. A tension spring 77 having its lower end secured to the adjacent plate member 48 and its upper end fixed to the flange of one of the channel members 72, insures a firm contact between cam 74 and cam follower 75 at all times.

The platform 40 forms an elongated structure, similar to that described above. The platform 40 is disposed in slidably engaging relation to tubular members 64 with its horizontal connecting plate 78 facing downwardly in vertically spaced relation to lower platform structure 37. The ends of the upper platform structure 40 are each provided with a cover plate 80 having secured thereto an outwardly projecting pin 81 affording pivotal connection with the upper end of a motion transmitting rod 82 connected at its lower end to a Fafnir eccentric 83 mounted on the end of the shaft 67. It is preferable that the rod 82 be adjustable lengthwise, as shown in Figs. 1 and 2, in order to provide for a variation in the positioning of the upper transverse platform structure 40.

Looking now at Figs. 1, 2 and 5, it is seen that the vertically spaced and movable transverse platform structures 37 and 40, described above, operatively support heating and molding equipment for forming open topped containers 33 from the thermoplastic strip material 31. The platform 37 supports laterally spaced heating units 36 which comprise a pair of elements 84 receiving electricity from a conveniently located source (not shown)

through wires 85, and a thermostat 86 for controlling the temperature of the unit. A hollow forming die or mold 38 is removably disposed in a receptacle 87 immediately forward of each heating unit 36 on the platform 37 and in longitudinal alignment therewith. An opening 88 in the bottom of the die permits air to escape therefrom. The die holding receptacle 87 is detachably supported on the platform as by screws 90.

To prevent air bubbles from forming and distorting the container, a removable slug 91 may be positioned on the bottom of the die. This slug may be inscribed with advertising matter which would appear on the bottom of the formed container.

The upper transverse structure 40 includes a series of pairs of vertically aligned openings 92 (Fig. 5) disposed longitudinally of the front and rear flanges of channel members 93 in overlying relation to the heating units 36 and dies 38, and each of the upper openings threadably receives an adjusting screw 94 having an elongated reduced lower end portion 95. This reduced end portion affords a guide means for a compression spring 96 the purpose of which will be seen as the disclosure progresses.

A source of fluid pressure which may be at any desired temperature (not shown) communicates with a series of vertically disposed hollow tubes 97 (Fig. 5), each positioned to direct fluid pressure into one of the hollow forming dies 38. The lower end of each tube detachably supports, as by a screw 98 having an opening 100 therethrough, a platen 101 having a resilient facing material 102, such as rubber, fixed to the downwardly facing surface thereof to provide an air tight seal for the die 38. The platen preferably comprises a circular inner section 103 and two removable outer parts 104 of larger area, one having the aforementioned rubber facing 102, disposed in surface abutting relation thereto. The uppermost part of platen 101 has four vertical rods 105 fixed thereto, which extend upwardly through openings (not shown) in overlying plate member 78 to afford a guide means for the platen 101. The rods 105 are provided with heads 109 to limit the downward vertical motion of the assembly. A longitudinally extending elongated plate member 106, having an opening 107 therethrough slightly larger than circular inner section 103 of the platen 101 is detachably secured to platen 101 for limited vertical movement relative thereto by positioning outer parts 104 of the platen 101 on either side of opening 107 and securing the platen 101 and plate member 106 in position by means of screw 98, as shown in Fig. 5. The upper surface of each plate member 106 includes a pair of studs 108 positioned to underlie adjusting screws 94 and afford a seat for compression springs 96 which act to maintain plate member 106 and platen 101 in vertically spaced relation to the overlying transverse platform structure 40. The rear end of each plate member 106 includes a vertical flange 110 having a slot 111 therein. A thin bar 112, which is adjustably secured to the plate 106, as by screws 113, has a slot 114 which is positioned relative to slot 111 so as to receive the strip material 31 from the feed roll 62 and guide same in closely underlying relation to platen 101.

At this point it should be noted that screw 98 securing platen 101 to the fluid pressure tube 97 is readily replaceable by a screw having a different size opening therethrough, if it is desired to vary the rate of flow of the air entering the underlying die 38.

Mounted on the main frame structure 20 of the packaging machine immediately forward of container forming mechanism 24 just described is a chain type conveyor mechanism 22 for moving container strips 31 through the packaging machine. The angle members 52 at opposite ends of the upper longitudinal frame members 51 each rotatably mount a pair of vertically spaced guide sprockets 115 supporting a pair of laterally spaced continuous chains 116. A drive sprocket 117 fixed to one of the stub shafts 118 supporting one of the guide sprockets 115 is connected by a chain 120 to a sprocket 121 which connects to a Geneva drive (not shown) supported within a housing 122 on the adjacent vertical plate member 48 of the main frame 20. A more detailed analysis of the drive means will be set forth hereinafter.

A series of parallel transverse slats 123 (Fig. 9) are positioned on chains 116, as by screws 124, for support thereby, as seen in Figs. 6, 8, and 9. These slats 123 are spaced along the conveyor chains 116 to conform with the size of the formed containers 33 and engage successive flange portions 35 of the containers 33 to supportedly move same forwardly along the frame 20 of the machine. A series of longitudinal members 125 (Fig. 9) are connected to the main frame structure 20 in closely underlying relation to the transverse slats 123 so as to afford a guide means for the containers 33 which are carried by the conveyor 22. These guide members 125 are positioned so as to conform with the width of the containers 33 formed by the machine.

The filling mechanism 25 is positioned above and intermediate the ends of the conveyor 22. The filler mechanism 25 is supported on the underlying frame members 51 by suitable means such as legs 126 which are bolted to the members 51. The filler mechanism 25 may be of any conventional design capable of delivering a measured portion of food, or other material, at timed intervals to each of the laterally aligned open topped containers 33 as they are brought by the conveyor 22 to a position underlying the spouts 127 of the filler mechanism 25. Since the particular construction of the filler mechanism 25 comprises no essential portion of the present invention, a detailed explanation and showing thereof is believed unnecessary for a thorough understanding of the invention.

The mechanisms for feeding the cover material 41, covering, sealing, and separating the containers 33 are located at the forward end of the conveyor 22. The cover strip feeding mechanism 26 is generally similar in structure and function to the strip feeding mechanism 23 described previously. The cover strip feeding mechanism 26 is supported on a frame structure 128 comprising a pair of laterally spaced members 129 disposed longitudinally of the conveyor 22 on opposite sides thereof and a pair of vertical tubular members 130 secured at their lower ends, as by welding, to the upper edge of underlying plates 48 on the main frame. The upper members of the frame structure 128 for the cover strip feeding mechanism 26 carry longitudinally spaced pairs of axially aligned bearing supports 131 receiving opposite end portions of parallel roller shafts 132 for mounting rolls 133 of cover strip material 41 thereon. The forward shaft 132 has a sprocket wheel 176 fixedly mounted thereon for connection in power receiving relation with a suitable source of power, such as the motor 71, in a manner to be described later. Since the operating structure of the cover strip feeding mechanism 26 is identical with that described for the container strip feeding mechanism 23, it is believed unnecessary to go into the constructional details of the roller shafts 132.

As seen in Figs. 1 and 10 through 13, the covering strip 41 is fed through a guide plate 135 which is disposed in closely spaced overlying relation to the upper surface of conveyor structure 22 and having a rearwardly facing upwardly curved end portion 136 for receiving covering strip material 41 in overlying contact relation with upper flanged surface 35 of the container 33. The guide plate 135 is formed with inwardly facing flange portions 137 along each edge, for supporting the marginal outer edges of the container 33 and covering strip material 41, and is supported by vertical bracing elements 138 fixed to the overlying frame member 129.

The sealing mechanism 27 is positioned (see Figs. 1 and 10 through 13) forwardly of the guide plate 135 and the end of the conveyor 22 and includes a transversely disposed heat conductor, in the form of a steam pipe 42 communicating with a convenient source (not shown) of steam through the smaller pipes 140. The steam pipe 42 is rigidly supported, as by welding, by the overlying frame member 129. The lower surface of steam pipe 42 is positioned to engage the top surface of the covered containers 33 as they move into underlying relation thereto through the propelling action of the conveyor 22.

Underlying the steam pipe 42 just referred to, is the vertically movable platform structure 43 comprising a pair of oppositely facing spaced channel members 141 which are joined at their upper flanges by a plate 142 having vertical openings through opposite end portions for slidably engaging tubular frame members 130. Vertical motion is imparted to platform structure 43 by a drive means including a transverse shaft 143 journaled at opposite end portions thereof in the vertical plates 48 forming the sides of the machine frame structure 20, a Fafnir eccentric 144 mounted on the projecting end portion of a shaft 143 and having a vertically extending rod 145 of adjustable length connected thereto, and a pin 146 carried in projecting relation to an end cover plate 147 fastened to platform structure 43 and pivotally connected with the upper end of the connecting rod 145. The transverse shaft 143 also includes a sprocket 148 secured thereto and connected by a chain 150 with a sprocket 151 carried by the stub shaft 152 of the motor 71.

A container support 153 is positioned on upper plate 142 of platform structure 43 for engagement with the marginal flanged portions of each container 33 to press them against the steam pipe 42 and thereby hermetically seal cover strip material 41 to the container 33. The container support 153 includes a recessed part 154 designed to receive the filled portion of container 33 and is yieldably held in position on the platform by a screw 155 having a cylindrical shank portion 156 which slidably engages the side wall of a cylindrical opening 157 through the bottom of the support 153 and a set of four compression springs 158 seated in downwardly facing recessed portions 160 in the bottom of the support 153 and resting at their lower end on the platform 142. A keying block 159 fixed to plate 142 prevents rotation of the container support 153. The container support 153 is thus designed to avoid possible damage to the containers 33 through the application of an excessive amount of pressure. And it is seen, therefore, that rotation of transverse shaft 143 carried by main frame 20 effects a vertical movement of the container support 153 to successively engage the marginal flanged surfaces 35 of the overlying container against the cover strip material 41 and steam pipe 42 and then platform 43 recedes to permit movement of the sealed container or package 30 to the right as viewed in Figs. 1 and 10.

And for guiding and supporting the sealed containers 30 in their forward movement there is provided a plate member 161 which is supported by the bracing elements 138. This plate member 161 is similar in cross section to plate member 135 previously described for guiding covering strip 41, and includes flanged portions 162 for supporting the edges of the packages 30.

The cutting mechanism 28 which is positioned forwardly of the sealing mechanism 27 and guide plate 161 is shown in Figs. 1 and 10 and 15. The cutting mechanism 28 includes a transverse knife 45 secured to the overlying frame structure 128 in depending relation thereto with its cutting edge disposed just above the path of movement of connected packages 30. A series of cooperating knives 44 are secured to a forwardly extending portion 163 of the plate 142 so that upward movement of the platform 43 brings the knives 44 and 45 into engagement with the transverse marginal portions 164 of the connected packages 30 intermediate the sealed packages 30 to thereby separate the forwardmost package 30 from the succeeding package 30. Suitable means such as the conveyor 46 may be provided for receiving the individual packages 30 after they have been thus separated from the remaining series of connected packages 30.

The power drive mechanism 21 shown in Fig. 1 includes a plurality of chain drives which are connected in power receiving relation to the electric motor 71. The motor 71 is supported on the bottom member 50 of the machine frame 20. The shaft 152 of the motor 71 has a plurality of sprocket wheels secured thereto in nonrotatable relation. One of the sprocket wheels 151, as has previously been set forth, is connected by a chain 150 to the sprocket wheel 148 on transverse shaft 143 at the forward end of the machine to impart vertical motion to platform structure 43 through the Fafnir eccentric 144. This forward transverse shaft 143 is also provided with another sprocket wheel 148 which is connected through chain 70 with the sprocket wheel 68 on the transverse shaft 67 at the rear of the machine for effecting vertical movement of the upper platform structure 40 of the forming mechanism 24. In addition, rear shaft 67 includes a smaller drive sprocket 170 which is connected by a chain 166 with a sprocket 171 mounted on forward shaft 60 of the container strip feeding mechanism 23 to cause rotation of the strip material roll 62. Movement of platform structure 37 mounting the heating and molding blocks is effected by the cam 74 on rearward transverse shaft 67 as previously noted.

A second sprocket wheel 167 on the motor drive shaft 152 is connected by a chain 165 to a sprocket 172 which in turn is connected through a Geneva drive to an upper drive sprocket 121 and chain 120 in driving relation to the adjacent conveyor chain guide sprocket 115 for intermittently driving conveyor chain 116. The third sprocket wheel 168 on motor shaft 152 is connected by the chain 169 with sprocket 173 to drive filler mechanism 25. A sprocket 174 on the forward transverse shaft 143 is connected by a chain 175 to the sprocket 176 for operating the cover strip feeding mechanism.

It is to be understood that the chain and sprocket arrangements just described afford proper speed of operation of the package machine mechanisms as well as proper timing of the various operations. Since the particular drive means is not an essential part of the present invention, it is believed that a more detailed description thereof would contribute nothing toward a complete understanding of the invention and will, therefore, be omitted.

In the preceding description, there has been disclosed a novel method of packaging material in a sealed container having a definite contour and which is easily opened; and a packaging machine which is particularly adapted to carry out this method.

Various of the features of the invention believed to be new are set forth in the following claims.

I claim:

1. Apparatus for forming packages comprising a frame structure, a source of power on said frame structure, means for successively heating equally spaced sections of a strip of thermoplastic material as it is drawn through the apparatus, a vertically movable platform mounted on said frame structure and supporting a hollow forming die for movement therewith, a platen carried by said frame structure in vertically spaced relation to said hollow forming die and having a vertical opening therethrough communicating with a source of super-atmospheric gas pressure, a strip feeding means supported by said frame structure and driven by said source of power to move said material into position adjacent said heating means and between said platen and die, said strip feeding means being operatively interconnected with said platform and said source of gas pressure so that equally spaced sections of said material are successively heated to a moldable state and then deformed by the application of gas pressure to the surface of the heated section overlying said die to adopt the shape of said die thereby forming a series of interconnected open topped containers, conveyor mechanism operably carried by said frame structure and positioned thereon to receive the formed containers for movement therewith, filler means disposed in overlying relation to said conveyor and operable to place a measured portion of substance in each of said containers, means for feeding a second strip of thermoplastic material in parallel covering relation to each of said filled containers, a heat conductor suported by said frame structure and disposed in overlying relation to one of said covered containers, means for pressing the covered surface of said container into contact with said heat conductor to hermetically seal said cover strip to said container, and a cutting means for separating the filled and sealed containers.

2. In a packaging machine of the type described, means for forming a longitudinal series of equally spaced containers from a strip of thermoplastic material, comprising a frame structure supporting a vertically movable platform, a heating block fixedly mounted on said platform for movement therewith, a hollow forming die carried by said platform in horizontally spaced relation to said heating block, a platen secured to said frame structure in overlying generally parallel relation to said heating block and die, a source of super-atmospheric fluid pressure communicating with an opening in the platen disposed in vertically aligned relation with the hollow portion of said die, and means for intermittently moving said strip of thermoplastic material beneath said platen and parallel thereto in a direction such that equally spaced sections of said strip successively overlie said heating block and said die, said heating block and die being movable to press the overlying thermoplastic material against said platen to heat a first section of said material to a moldable state and to form an open topped container upon application of fluid pressure through said opening in the platen to a previously heated second section of material overlying said hollow forming die.

3. In a packaging machine of the type described, means for forming a longitudinal series of equally spaced containers from a strip of thermoplastic material, comprising a frame structure supporting a vertically movable platform, a heating block fixedly mounted on said platform for movement therewith, a hollow forming die carried by said platform in horizontally spaced relation to said heating block, said die having a passageway extending through the bottom wall thereof, a platen secured to said frame structure in overlying generally parallel relation to said heating block and die, a source of super-atmospheric fluid pressure communicating with an opening in the platen disposed in vertically aligned relation with the hollow portion of said die, and means for intermittently moving said strip of thermoplastic material beneath said platen and parallel thereto in a direction such that equally spaced sections of said strip successively overlie said heating block and said die, said heating block and die being movable to press the overlying thermoplastic material against said platen to heat a first section of said material to a moldable state and to form an open topped container upon application of fluid pressure through said opening in the platen to a previously heated second section of material overlying said hollow forming die.

4. In a packaging machine, means for forming a longitudinal series of equally spaced containers from a strip of thermoplastic material, comprising a frame structure supporting a vertically movable platform, a heating unit fixedly mounted on said platform for movement therewith, a hollow forming die mounted on said platform in spaced relation to said heating unit, a removable plate disposed in the bottom of said die, said die having a passageway extending through one wall thereof at a point below the upper surface of said plate, a platen secured to said frame structure in overlying parallel relation to said heating unit and die, a source of super-atmospheric fluid pressure communicating with an opening in said platen disposed in vertically aligned relation with the hollow portion of said die, and drive means on said frame structure operable to intermittently move said strip of thermoplastic material beneath said platen and parallel thereto in a direction such that equally spaced sections of said strip successively overlie said heating unit and said die, said drive means also operating to move said heating unit and said die into engagement with said strip to press same against said platen to heat a first section of said material to a moldable state and to form a flanged open topped container upon application of fluid pressure through said opening in the platen to a previously heated second section of material overlying said die.

5. In a packaging machine, means for forming a longitudinal series of equally spaced containers from a strip of thermoplastic material, comprising a frame structure supporting a vertically movable platform, a heating unit positioned on said platform for movement therewith, a hollow forming die mounted on said platform in horizontally spaced relation to said heating unit, said die having a flanged upper surface disposed peripherally of the hollow portion of said die and substantially coplanar with the upper surface of said heating unit, said die also having a passageway through the bottom portion thereof for allowing air to escape from the interior of the die, a removable plate disposed in the bottom of said hollow in covering relation to the inner end of said passageway, a platen secured to said frame structure in overlying parallel relation to said heating unit and die for vertical movement relative thereto, a source of super-atmospheric fluid pressure communicating with an opening in said platen disposed in vertically aligned relation with the hollow portion of said die, and drive means on said frame structure operable to intermittently move said strip of thermoplastic material through the path defined by said platen and said heating unit and die so that equally spaced sections of said strip successively overlie said heating unit and die, said drive means also operating to move said heating unit and die and said platen into pressing engagement with opposite surfaces of said strip to heat a first section of said material to a moldable state and to form a flanged open topped container upon application of fluid pressure through said opening in the platen to a previously heated second section of material overlying the die, further operation of said drive means causing said platform and platen to separate and effecting longitudinal movement of said strip to a position placing said first section of material in vertically aligned relation with said die.

6. In a packaging machine, means for forming a longitudinal series of equally spaced containers from a strip of thermoplastic material, a frame structure supporting a vertically movable platform, a heating block fixedly mounted on said platform for movement therewith, a hollow forming die carried by said platform in horizontally spaced relation to said heating block, said die having a passageway extending through the bottom wall thereof, a vertically movable platen resiliently secured to said frame structure in overlying generally parallel relation to said heating block and die, a source of super-atmospheric fluid pressure communicating with an opening in the platen disposed in vertically aligned relation with the hollow portion of said die, and means for intermittently moving said strip of thermoplastic material beneath said platen and parallel thereto in a direction such that equally spaced sections of said strip successively overlie said heating block and said die, said heating block and die and said platen being movable to press the thermoplastic material therebetween to heat a first section of said material to a moldable state and to form an open topped container upon application of fluid pressure through said opening in the platen to a previously heated second section of material overlying said hollow forming die.

7. In a packaging machine, means for covering and separating interconnected containers formed from a continuous strip of thermoplastic material comprising means, for moving the strip of formed containers along its path to bring the depressions therein successively to a predetermined point in said path at selectively timed intervals; a second strip of thermoplastic material movable into covering relation to said containers at a position along the path of movement of the latter rearward of said predetermined point; a heat conductor disposed at said predetermined point in position to contact the covered surface of each of said containers as it reaches said point; a stationary knife disposed with its cutting edge facing generally downward in the path of said containers and forward of said heat conductor; a vertically movable platform underlying said heat conductor and stationary knife and having mounted thereon a recessed part for supportedly engaging the non-distorted flange portions of each container as it reaches said predetermined point and also mounting a cutting edge positioned for engagement with said stationary knife; and additional drive means coacting with said strip moving means to move said platform upwardly as each of said containers reaches said predetermined point to thereby place said recessed part in engagement with the flanged portion of the container and press said flanged portion against said heat conductor to hermetically seal said cover strip in position, said upward movement of said platform also effecting an engagement of said knife and cutting edge with a transverse flange portion of the forwardmost sealed container to sever same from the remainder of the strip.

8. In a packaging machine, apparatus for covering and separating equally spaced depressions formed in a continuous strip of thermoplastic material comprising means for moving the formed depressions longitudinally of the machine to successively place each of said depressions at a predetermined position, a frame structure supporting a second strip of thermoplastic material, means operatively moving said second strip into covering relation to said formed depressions at a position along the path of movement of the strip rearward of said predetermined position, a heat conductor supported by said frame structure at said predetermined position to contact the covered surface of each of said depressions as it reaches said point, a stationary knife carried by said frame structure forwardly of said heat conductor with its cutting edge facing generally downward in the path of said strip material, a platform structure underlying said frame structure in vertically movable relation thereto, a recessed part, proportioned to extend about said depressions, resiliently carried by said platform for limited vertical movement relative thereto and disposed in generally vertical alignment with said heat conductor, a cutting edge mounted on said platform in position for engagement with said stationary knife, and drive means coacting with said strip moving means to raise said platform as each of said covered depressions reaches said predetermined position to thereby place said recessed part and heat conductor in pressing relation to opposite sides of the flanged surface portions of the strip surrounding each depression to hermetically seal said cover strip in position, the upward movement of said platform also resulting in an engagement of said knife and cutting edge with a transverse flange portion of the forwardmost sealed depression to sever same from the succeeding portion of the strip material.

9. In a packaging machine including means for forming a longitudinal series of equally spaced depressions in a continuous strip of material, means for moving said depressed portion of the strip into the path of mechanism for completing the packaging operation comprising a supporting frame structure including at least two laterally spaced and horizontally aligned parallel guide members, a pair of endless chain drives operably supported on said frame on opposite sides of said guide members in generally parallel relation thereto with the upper path of said chains being generally coplanar with said guide members, a plurality of elongated slats secured at opposite ends thereof to said endless chains in transverse adjacent relation to said guide means, said elongated slats being positioned along said drive means to conform generally with the length of said depressions in order that said longitudinal series of equally spaced depressions may be held in position by a corresponding series of openings formed by said transverse slats and guide members for movement with said chain drives.

10. In a packaging machine including means for forming a longitudinal series of equally spaced depressions in a continuous strip of material, means for moving said depressed portion of the strip into the path of mechanism for completing the packaging operation comprising a supporting frame structure including a pair of laterally spaced guide members disposed longitudinally of said frame, a pair of endless chain drives operably supported on opposite sides of said frame structure in parallel relation to the intermediate guide members with the upper surfaces of said guide members and said chain being generally coplanar, and conveyor slats mounted on said chain drives so as to provide a series of horizontal, spaced apart, carrying surfaces, said conveyor slats being spaced along said chain drive to conform with the spacing of said depressions.

11. In a packaging machine having means for forming a longitudinal series of spaced-apart, interconnected, open topped containers having outwardly extending, horizontal side flanges, an endless conveyor comprising a frame structure mounting a pair of flexible chain belts, conveyor slats mounted on said belts so as to provide a series of horizontal, spaced-apart, carrying surfaces, said conveyor slats being positioned along said chain belt to conform with the spacing of said containers and a pair of guide members supported by said frame structure in closely underlying transverse relation to said conveyor slats, said guide members being spaced so as to conform with the width of said containers to supportingly engage the side flange portions thereof.

12. In a packaging machine, means for forming a longitudinal series of equally spaced containers from a strip of thermoplastic material comprising a frame structure, means supported by said frame structure for heating successive sections of a thermoplastic material as it is drawn through the machine, a vertically movable platform mounted on said frame structure and supporting a hollow forming die in horizontally spaced relation to said heating means, a platen secured to said frame structure in an overlying generally parallel relation to said forming die, a source of super-atmospheric fluid pressure communicating with an opening in the platen disposed in vertically aligned relation with the hollow portion of said die; and means for intermittently moving said strip of the thermoplastic material through the machine in a manner such that equally spaced sections of said thermoplastic material are successively moved into position adjacent said heating means and then between said platen and said forming die, said forming die being movable to press a previously heated overlying section of thermoplastic material against said platen to form an open topped container upon the application of said fluid pressure through said opening in the platen.

13. In a packaging machine, means for forming a longitudinal series of equally spaced containers from a strip of thermoplastic material comprising a frame structure, means supported by said frame structure for heating successive sections of a thermoplastic material as it is drawn through the machine, a vertically movable platform mounted on said frame structure and supporting a hollow forming die in horizontally spaced relation to said heating means, said forming die having a passageway extending through the bottom wall thereof, a platen secured to said frame structure in an overlying generally parallel relation to said forming die, a source of super-atmospheric fluid pressure communicating with an opening in the platen disposed in vertically aligned relation with the hollow portion of said die, and means for intermittently moving said strip of thermoplastic material through the machine in a manner such that equally spaced sections of said thermoplastic material are successively moved into position adjacent said heating means and then between said platen and said forming die, said forming die being movable to press a previously heated overlying section of thermoplastic material against said platen to form an open topped container upon the application of said fluid pressure through said opening in the platen.

14. In a packaging machine, means for forming a longitudinal series of equally spaced containers from a strip of thermoplastic material comprising a frame structure, means supported by said frame structure for heating successive sections of a thermoplastic material as it is drawn through the machine, a vertically movable platform mounted on said frame structure and supporting a hollow forming die in horizontally spaced relation to said heating means, a vertically movable platen resiliently secured to the frame structure in overlying, generally parallel relation to said forming die, a source of super-atmospheric fluid pressure communicating with an opening in the platen disposed in vertically aligned relation with the hollow portion of said die, and means for intermittently moving said strip of the thermoplastic material through the machine in a manner such that equally spaced sections of said thermoplastic material are successively moved into position adjacent said heating means and then between said platen and said forming die, said forming die being movable to press a previously heated overlying section of thermoplastic material against said platen to form an open topped container upon the application of said fluid pressure through said opening in the platen.

References Cited in the file of this patent

UNITED STATES PATENTS

| | | |
|---|---|---|
| 1,958,762 | Mirabella | May 15, 1934 |
| 1,980,361 | Spear | Nov. 13, 1934 |
| 2,219,578 | Pittenger | Oct. 29, 1940 |
| 2,229,613 | Strauch | Jan. 21, 1941 |
| 2,280,405 | Frostad | Apr. 21, 1942 |
| 2,298,363 | Ganz | Oct. 13, 1942 |
| 2,382,175 | Salfisberg | Aug. 14, 1945 |
| 2,387,747 | Cowley | Oct. 30, 1945 |
| 2,472,440 | Salfisberg | June 7, 1949 |
| 2,486,758 | Pfeiffer | Nov. 1, 1949 |
| 2,530,306 | Land | Nov. 14, 1950 |
| 2,573,711 | Johnson et al. | Nov. 6, 1951 |
| 2,624,164 | Donofrio | Jan. 6, 1953 |